(12) United States Patent
Ramoutar et al.

(10) Patent No.: US 9,156,418 B2
(45) Date of Patent: Oct. 13, 2015

(54) SMALL OVERLAP FRONTAL IMPACT COUNTER-MEASURE

(71) Applicant: Toyota Motor Engineering & Manufacturing North America, Inc., Erlanger, KY (US)

(72) Inventors: Naipaul D. Ramoutar, Ann Arbor, MI (US); Taichi Yamashita, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/317,682

(22) Filed: Jun. 27, 2014

(65) Prior Publication Data

US 2014/0312637 A1 Oct. 23, 2014

Related U.S. Application Data

(63) Continuation of application No. 13/633,406, filed on Oct. 2, 2012, now abandoned.

(51) Int. Cl.
*B60J 7/00* (2006.01)
*B60R 19/24* (2006.01)

(52) U.S. Cl.
CPC ........... *B60R 19/24* (2013.01); *B60R 2019/247* (2013.01)

(58) Field of Classification Search
CPC ........ B60R 19/18; B60R 19/26; B60R 19/20; B60R 19/32; B60R 19/34; B60R 9/06; B60R 9/10; B60R 19/48; B60D 1/56

USPC .......... 296/187.09; 180/274; 293/1, 102, 117, 293/120, 133

See application file for complete search history.

(56) References Cited

U.S. PATENT DOCUMENTS 3,789,944 A * 2/1974 Barenyi ........................ 180/68.6
4,358,152 A * 11/1982 Mayer et al. ............. 296/187.09

(Continued)

FOREIGN PATENT DOCUMENTS

JP 2004306871 A 11/2004

OTHER PUBLICATIONS

Non-Final Office Action mailed Jun. 4, 2013 for U.S. Appl. No. 13/633,406, filed Oct. 22, 2014.

(Continued)

*Primary Examiner* — Kiran B Patel
(74) *Attorney, Agent, or Firm* — Dinsmore & Shohl LLP (57) ABSTRACT

A support structure assembly for an automotive vehicle includes a side member extending in a generally longitudinal direction and having a forward end; a link member having a generally fixed shape and having outer and inner mounting portions with the inner portion being mounted to the side member via an inner hinged connection; and a bumper having a main bumper member and a bumper extension member forming an end portion of the bumper. The bumper extends generally transverse and lateral to the longitudinal direction of the side member, and the bumper extension member extends laterally across and beyond the forward end of the side member. The bumper extension member includes forward and rearward wall portions. The rearward wall portion is sandwiched between the main bumper member and the forward end of the side member.

18 Claims, 9 Drawing Sheets

(56) References Cited

U.S. PATENT DOCUMENTS

| | | |
|---|---|---|
| 6,174,009 B1 | 1/2001 | McKeon |
| 6,286,867 B1 * | 9/2001 | Braemig et al. ............... 280/784 |
| 6,296,298 B1 * | 10/2001 | Barz ........................ 296/187.02 |
| 6,511,119 B2 * | 1/2003 | Takase et al. ............. 296/187.09 |
| 6,866,115 B2 * | 3/2005 | Miyasaka ..................... 180/311 |
| 6,957,846 B2 | 10/2005 | Saeki |
| 7,559,589 B2 | 7/2009 | Nees |
| 7,748,507 B2 | 7/2010 | Canot et al. |
| 7,819,218 B2 | 10/2010 | Eichberger et al. |
| 7,926,847 B2 * | 4/2011 | Auer et al. .................... 280/784 |
| 8,480,130 B2 * | 7/2013 | Dandekar et al. ............. 280/784 |
| 8,596,711 B2 * | 12/2013 | Yasui et al. ............... 296/187.09 |
| 8,888,168 B2 * | 11/2014 | Kuwabara et al. ........ 296/187.09 |
| 8,985,258 B1 * | 3/2015 | Midoun et al. ................ 180/274 |
| 8,985,671 B1 * | 3/2015 | Lei et al. ....................... 296/133 |
| 8,991,544 B1 * | 3/2015 | Stratten et al. ................ 180/274 |
| 8,991,903 B1 * | 3/2015 | Alavandi et al. ......... 296/187.09 |
| 9,004,216 B1 * | 4/2015 | Baccouche et al. ........... 180/274 |
| 9,010,845 B1 * | 4/2015 | Ramoutar et al. ....... 296/187.09 |
| 9,016,768 B2 * | 4/2015 | Makino et al. .............. 296/187.1 |
| 9,027,695 B2 * | 5/2015 | Nakamura et al. ............. 180/247 |
| 2004/0195862 A1 * | 10/2004 | Saeki ....................... 296/187.09 |
| 2008/0023954 A1 * | 1/2008 | Eichberger et al. ........... 280/784 |
| 2014/0008924 A1 * | 1/2014 | Han et al. ...................... 293/133 |
| 2014/0062106 A1 * | 3/2014 | Han ............................. 293/133 |
| 2014/0091595 A1 * | 4/2014 | Ramoutar et al. ....... 296/187.09 |
| 2014/0091598 A1 * | 4/2014 | Park et al. ................ 296/203.02 |
| 2014/0117717 A1 * | 5/2014 | Parkila et al. ........... 296/187.09 |

OTHER PUBLICATIONS

Final Office Action mailed Dec. 31, 2013 for U.S. Appl. No. 13/633,406, filed Oct. 22, 2014.

* cited by examiner

SMALL OVERLAP FRONTAL IMPACT COUNTER-MEASURE

CROSS-REFERENCE TO RELATED APPLICATIONS

The present application is a Continuation of U.S. application Ser. No. 13/633,406, filed on Oct. 2, 2012, entitled "SMALL OVERLAP FRONTAL IMPACT COUNTER-MEASURE," the entirety of which is hereby incorporated by reference.

BACKGROUND

1. Technical Field

The present specification generally relates to a structural assembly in a vehicle. More specifically, the specification relates to a structural assembly that responds to a frontal impact, such as a small overlap impact, to limit the frontal impact force on the vehicle cabin.

2. Background

Automotive vehicles are often constructed at their front ends to include various support structure for the engine, wheels, suspension, bumper, and related components. These support structures can include longitudinal members that are generally aligned with the longitudinal axis of the vehicle, or lateral members that run in a generally transverse direction relative to the longitudinal members.

The support structures surrounding and supporting the engine compartment are ultimately connected to various structures that define the vehicle cabin. These cabin support structures can include a generally vertical door hinge pillar, the A-pillar that extends from the door hinge pillar to the roof of the vehicle, a cross beam and floor pan running laterally across the width of the vehicle, and rocker member extending rearward from the bottom of the hinge pillar.

These support structures provide support for the various vehicle components, as well as exterior structure, that are mounted thereto. Examples of vehicle components include the engine, transmission, radiator, suspension, wheels, and the like. Examples of exterior structure include the doors, roof, windshield, floor panels, hood, and the like. In addition to providing support for the various vehicle parts, the support structure also operates to protect the vehicle occupants in the event of a collision, such as a frontal impact collision.

One type of frontal impact collision is a small overlap impact. A small overlap impact is an impact where the majority of loading due to the impact occurs outside of the major longitudinal support structures of the vehicle. A small overlap impact can occur in variety of ways, such as a head on collision with a tree or post, a vehicle to vehicle oblique collision, or a vehicle to vehicle collinear or head-on collision.

Because the majority of the loading is outside the longitudinal support structures, the impacting body or "barrier" can result in the longitudinal support structure slipping off the barrier. Put another way, the vehicle longitudinal support structures may deform laterally inward relative to the barrier or provide limited interaction with the barrier. The barrier could continue to exert a longitudinal force toward the vehicle, with the force generally aligned with the wheel of the vehicle due to the relative lateral translation. Upon impact with the wheel, the force may be transmitted further toward the rear of the vehicle and toward the passenger cabin. The barrier and wheel would then exert a force upon the hinge pillar, the rocker, the A-pillar, the floorpan, and cross beam, each of which are at least partially aligned with the barrier during this type of collision. These structures can ultimately deform due to the collision with the barrier, resulting in encroachment of the structures upon the passenger cabin.

A solution to these issues of cabin encroachment has been to reinforce the longitudinal support structure, the hinge pillar, the A pillar, the rockers, and other support structures that surround the cabin so as to limit deformation of the structures and encroachment upon the cabin. However, the additional reinforcement can result in substantial increases in vehicle mass and material, which are undesirable in terms of cost and fuel mileage.

SUMMARY

The present specification provides a support structure assembly for an automotive vehicle, the support structure assembly comprising a side member extending in a generally longitudinal direction and having a forward end; a link member having a generally fixed shape and having outer and inner mounting portions with the inner mounting portion being mounted to the side member via an inner hinged connection; and a bumper having a main bumper member and a bumper extension member forming an end portion of the bumper. The bumper is mounted to the forward end of the side member and to the outer mounting portion of the link member and extends generally transverse and lateral to the longitudinal direction of the side member, and the bumper extension member extends laterally across and beyond the forward end of the side member.

In another aspect, the bumper extension member includes forward and rearward wall portions. The rearward wall portion is sandwiched between the main bumper member and the forward end of the side member.

In another aspect, the bumper extension member is bolted to the main bumper member in a location laterally inward from the side member.

In another aspect, the bumper extension member includes forward and rearward wall portions and the rearward wall portion is bolted to the main bumper member in a location laterally inward from the side member.

In another aspect, the forward and rearward wall portions each have an outboard end, the outboard ends being connected to the outer mounting portion of the link member in an outer hinged connection.

In another aspect, the outboard ends form a flange portion extending rearward and inward from the bumper extension member, the flange portion wrapping around the outer portion of the link member.

In another aspect, the flange portion forms a living hinge of the outer hinged connection.

In another aspect, the link member has a front surface facing the bumper and configured for engagement with the bumper extension upon a deformation of the bumper extension from a frontal impact force and to cause the frontal impact force to be translated through the link member and the inner hinged connection toward the side member.

In another aspect, wherein the link member has first, second, and third major side surfaces, the first major side surface being the front surface facing the bumper, the second major side surface facing the side member, and the third major side surface faces away from the bumper and extends between the inner and outer mounting portions of the link member.

In another aspect, the first major side surface is substantially flat.

In another aspect, the side member comprises a front portion, a rear portion, and an intermediate portion therebetween and the side member front portion is mounted to the bumper.

In another aspect, the inner mounting portion of the link member is mounted to the intermediate portion via the inner hinged connection and a spacer member is mounted to the intermediate portion. The spacer member disposed generally adjacent a vehicle engine located inward from the side member. The spacer member may be disposed generally adjacent an engine that is disposed inward from the side member.

In another aspect, a bulkhead is disposed inside the side member. The bulkhead is adjacent the spacer member, wherein the inner mounting portion is generally aligned with the bulkhead and the spacer.

In another aspect, the side member includes an upper wall portion, lower wall portion, inner wall portion, and outer wall portion, each wall portion at least partially defining a cavity extending along the side member.

In another aspect, the side member inner wall portion and outer wall portion each include indentations for allowing the side member to become compressed in response to a frontal impact force acting rearward thereon.

In another aspect, the side member includes a tapered portion for allowing the side member to buckle inward in response to a force acting inward on the side member.

In another aspect, the link member is configured to pivot about the inner hinged connection from a first position to a second position, where the outer mounting portion is disposed further forward in the first position than in the second position.

In another aspect, the link member inner mounting portion is disposed further inward and rearward in the second position than in the first position.

In another aspect, the support structure assembly further comprises a third position, wherein the link member outer mounting portion is further forward and inward in the third position than in the first position, and the link member is configured to pivot from the first position to the third position to the second position.

In one aspect, an automotive vehicle comprises a bumper at the front of the vehicle extending across a centerline of the vehicle, the bumper having first and second ends; a first side member extending rearward from the bumper first end; a second side member extending rearward from the bumper second end; a first bumper extension overlapping with and extending from the first end of the bumper member in an outward direction from the centerline, the first bumper extension extending across the first side member; a second bumper extension overlapping with and extending form the second end of the bumper member in an outward direction from the centerline, the second bumper extension extending across the second side member; a first link member having outer and inner mounting portions, the outer mounting portion mounted to the first bumper extension via a first flange forming a first living hinge, and the inner mounting portion mounted to the first side member via a first inner hinged connection; and a second link member having outer and inner mounting portions, the outer mounting portion mounted to the second bumper extension via a second flange forming a second living hinge, and the inner mounting portion mounted to the second side member via a second inner hinged connection.

Further objects, features and advantages of this specification will become readily apparent to persons skilled in the art after a review of the following description, with reference to the drawings and claims that are appended to and form a part of this specification.

DETAILED DESCRIPTION

Figure 1:
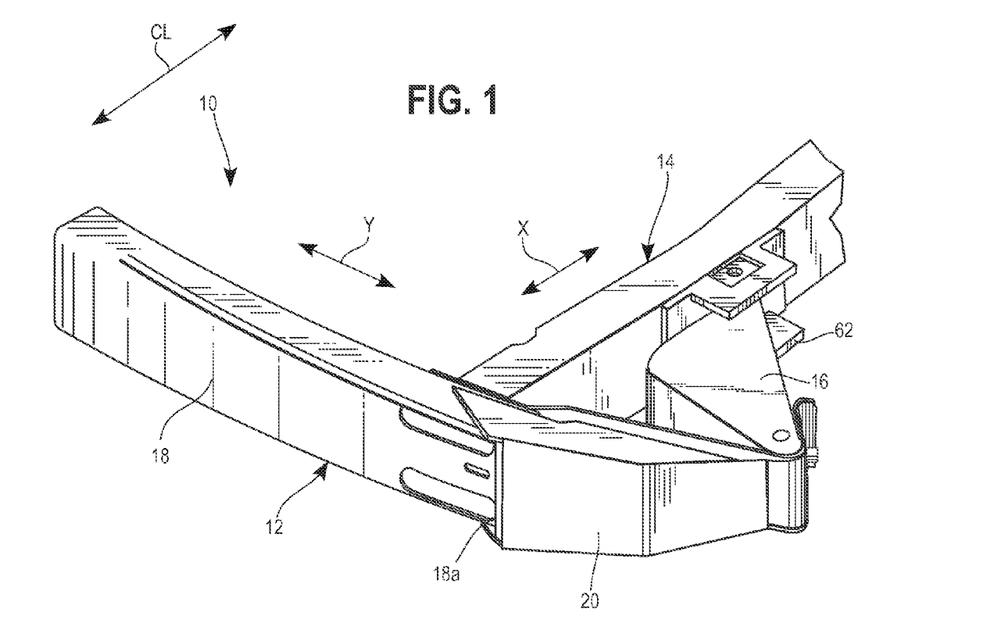
FIG. 1 is an isometric view of a support structure assembly.

Referring now to the drawings, FIG. 1 illustrates a support structure assembly 10 that includes a bumper 12, a longitudinal side member 14, and a link member 16 for an automotive vehicle. For reference, the assembly 10 includes an x-axis X that is generally parallel to a fore-and-aft centerline CL of the vehicle, and a y-axis Y that extends laterally across the centerline CL. The support structure assembly 10 is disposed at the front of the vehicle and generally surrounds the engine E (see FIG. 3), with the vehicle wheels being disposed outboard of the assembly 10. For purposes of discussion, the terms "inward" or "inboard" generally refer to a direction toward the centerline CL of the vehicle, and the terms "outward" or "outboard" refer to a direction away from the centerline CL of the vehicle. The bumper 12 is located at the front of the vehicle and extends laterally across the front of the vehicle in a manner known in the art. The longitudinal side member 14 is mounted to and extends rearward from the bumper 12, generally along the x-axis X. The link member 16 is mounted to both the bumper 12 and the longitudinal side member 14 so that a force acting on the bumper 12 will be transferred directly from the bumper 12 to the longitudinal side member 14 and also indirectly through the link member 16.

The bumper 12 can include a main bumper member 18 and bumper extension 20. The main bumper member 18 includes a left end portion 18a and a right end (not shown). For purposes of illustration and discussion, the left side of the support structure assembly 10 will be described, but it will be appreciated that the descriptions for the left side apply similarly to the right side, with the right side being a generally mirror image of the left side. The bumper extension 20 extends outward and rearward from the left end portion 18a of the bumper main bumper member 18. As shown in FIG. 1, the bumper extension 20 can have a generally bent shape, although the extension 20 could also have a more straight shape, curved shape, or other suitable shape. In one form, the bumper extension 20 is mounted to the bumper 12 via a mechanical connection using bolts, screws, or the like; however, other attachment methods could also be used.

Figure 2:
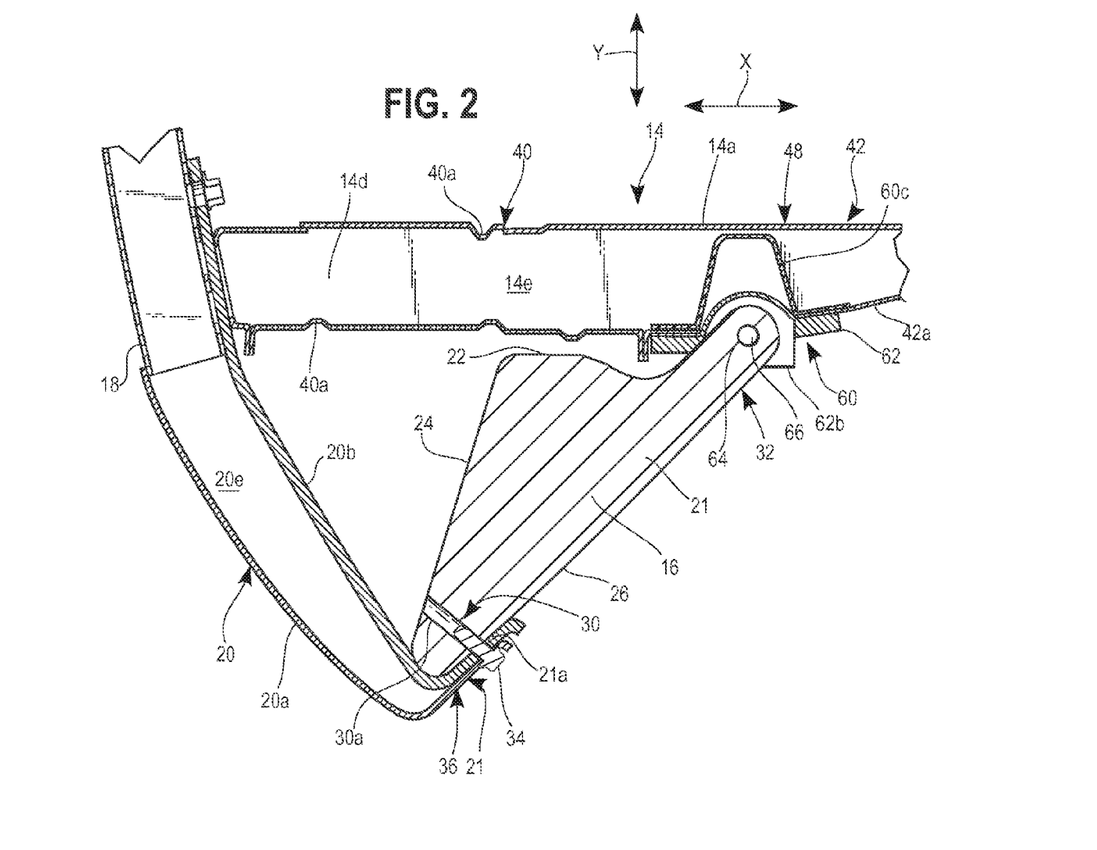
FIG. 2 is a cross-sectional view of the support structure assembly of FIG. 1.

FIG. 2 illustrates a cross-sectional plan view of the main bumper member 18, the bumper extension 20, the link member 16, and the longitudinal side member 14. With reference to FIG. 2, in one form, the bumper extension 20 comprises a forward wall portion 20a and a rearward wall portion 20b. The forward and rearward wall portions 20a and 20b cooperate with top and bottom wall portions 20c and 20d to form the bumper extension 20 and create a generally hollow form or cavity 20e. The hollow form of the bumper extension 20 reduces its weight but maintains a sufficient tensile strength. Additionally, the hollow form of the bumper extension 20 allows the bumper extension 20 to be deformed during a collision while maintaining a connection to the main bumper member 18 and link member 16.

The bumper extension 20 includes an outboard flange portion 21 formed from the ends of the forward and rearward wall portions 20a and 20b. The flange portion 21 extends rearward and inward from the bumper extension 20 toward the longitudinal side member 14, so that the flange portion 21 wraps around the link member 16. The flange portion 21 can be configured for mounting the link member 16 thereto. In one form, the flange portion 21 includes one or more mounting holes 21a through which a mechanical fastener, such as a bolt, screw, or the like, can pass for mounting the link member 16, which is further described below.

The link member 16 has a generally fixed body portion 21 having at least first, second, and third major side surfaces: inner surface 22, forward surface 24, and outer surface 26, as well as upper and lower surfaces 28 and 30. The link member 16 has a generally fixed and solid construction, so that in the event of a collision, the link member 16 can better withstand a force exerted against it and transmit a reaction force therethrough, in contrast to the hollow form construction of the bumper extension 20. Inner surface 22 generally faces inward. Outer surface 26 generally faces rearward and outward. Forward surface 24 generally faces forward and inward toward the bumper 12. These orientations reference the link member 16 being in a nominal position pre-collision. In the event of a collision, the link member 16 may be caused to rotate or pivot, so that the orientations of the various surfaces may be different when in a collision state, which is described in further detail below.

The link member 16 can include outer and inner mounting portions 30 and 32. The outer mounting portion 30 is the region of the link member 16 where the forward surface 24 and outer surface 26 intersect. The outer mounting portion 30 is mounted to the bumper extension 20 at the flange portion 21 via an outer hinged connection 36. In one form, the outer mounting portion 30 has one or more holes 30a extending generally horizontally therethrough. The outer hinged connection 36 can thereby be in the style of a living hinge, where one or more mechanical fasteners 34 extend through the holes 21a of the flange portion 21 and into the holes 30a of the outer mounting portion 30. Alternatively, rather than being a living hinge style connection, the hinged connection 36 could be in the form of a pin and bushing type connection, similar in style to the connection for the inner mounting portion 32, which is described in further detail below for the connection between the longitudinal side member 14 and the link member 16.

Figure 1A:
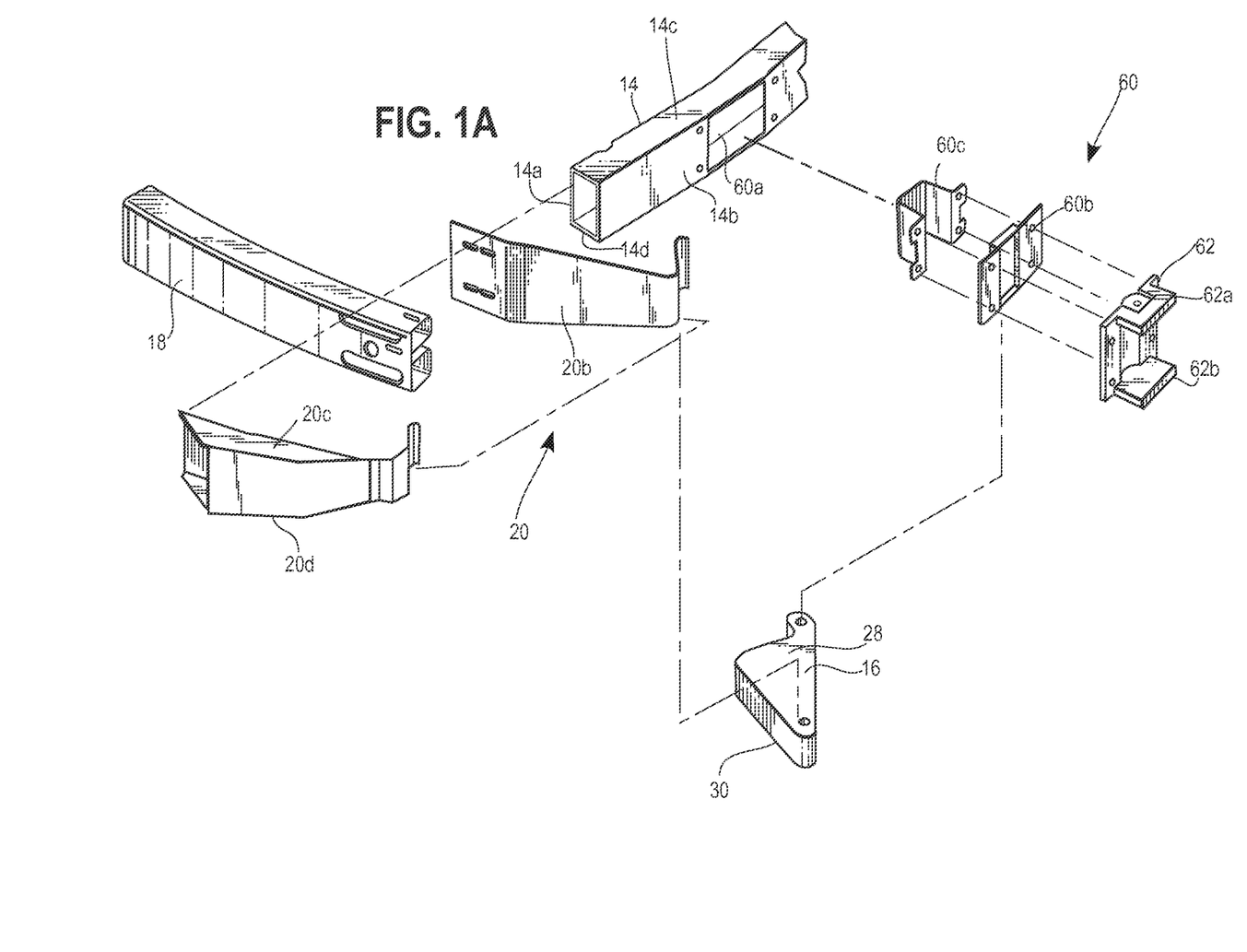
FIG. 1A is an exploded view of the support structure assembly of FIG. 1.

With reference to FIGS. 1, 1A, and 2, the longitudinal side member 14 extends rearward from the bumper 12 generally along the x-axis X. The longitudinal side member 14 has a generally hollow construction similar to the bumper extension 20. The hollow nature of the side member 14 can allow it to become deformed in the direction of the x-axis X or buckle along the direction of the y-axis Y in the event of a collision force acting thereon. The side member 14 can be comprised from an inner wall portion 14a, outer wall portion 14b, upper wall portion 14c, and lower wall portion 14d, which combine to define a side member cavity 14e extending along the length of the side member 14. For the sake of discussion, each of these wall portions will be described as being a unitary piece. However, it will be appreciated that each of these wall portions may be formed from multiple connected pieces. For example, the inner wall portion 14a may be made from multiple pieces mounted together.

The longitudinal side member 14 includes three longitudinal portions: a front portion 40, an intermediate portion 42, and a rear portion 44. The front portion 40 is mounted to the bumper 12 generally at the interface between the main bumper member 18 and the bumper extension 20. The front portion 40 is mounted to the bumper 12 via a mechanical connection such as bolts, screws, or the like. In one form, the rear portion 20b of the bumper extension 20 can be sandwiched between the main bumper member 18 and the side member front portion 40 for mounting therebetween. The front portion 40 can also include sidewall indentations 40a, reducing the compressive strength for helping to allow and control the deformation, more specifically the crushing, of the front portion 40 during a collision.

Figure 3:
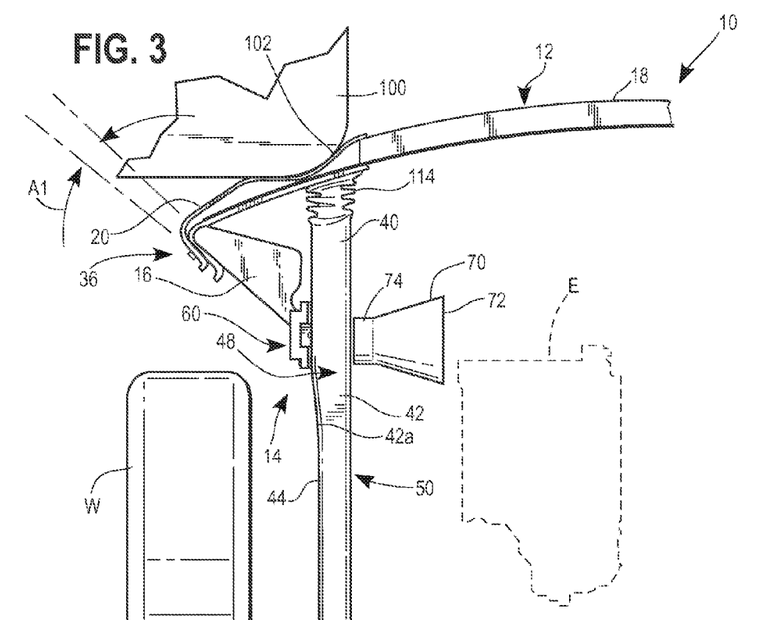
FIGS. 3-8 are top plan views of the support structure assembly of FIG. 1 showing various states of the support structure assembly during a collision with a barrier.
Figure 4:
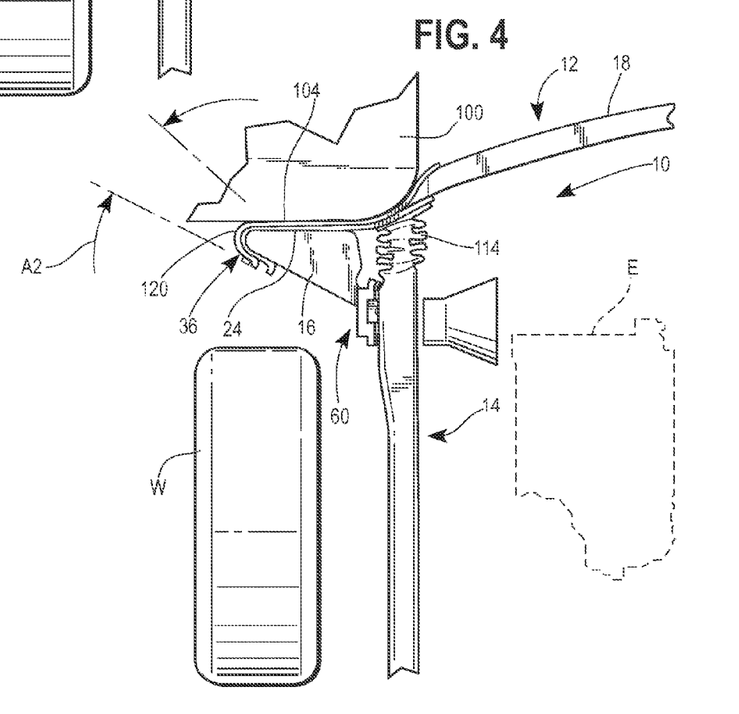

As shown in FIGS. 2 and 3, the front portion 40 transitions to the intermediate portion 42 at a forward interface region 48. The intermediate portion 42 extends rearward from the interface region 48 and is located generally adjacent the vehicle wheel W when in the nominal position. As shown in FIGS. 2-4, the intermediate portion 42 includes a tapered portion 42a that tapers to a smaller width relative to the front portion 40. The tapered portion helps to allow the intermediate portion 42 to buckle inward during a collision.

The intermediate portion 42 transitions to the rear portion 44 at a rearward interface region 50. The rear portion 44 is ultimately mounted to the passenger cabin via various complementary support structure known in the art. Thus, the longitudinal side member 14 ultimately extends from the bumper 12 to the passenger cabin support structure.

With reference to FIGS. 1, 1A, and 2, the link member 16 is mounted to the longitudinal side member 14 at the forward interface region 48. More specifically, the link member 16 is mounted via an inner hinged connection 60. The inner hinged connection 60 includes a hinge bracket 62 mounted to the outer wall portion 14b of the longitudinal side member 14. More specifically, the outer wall portion 14b includes an opening 60a. A patch member 60b is mounted to the opening 60a. A bulkhead member 60c is mounted to the inner surface of the patch member 60b so that the bulkhead member 60c is received within the cavity 14e of the side member 14. The hinge bracket 62 is mounted to the outer surface of the patch member 60b. The components of the inner hinged connection 60 are mounted together using mechanical fasteners such as screws, bolts, or the like.

With reference to FIGS. 1A and 2, the bracket 62 includes a hinge pin 64 extending in a generally vertical direction and mounted between upper and lower hinge support tabs 62a and 62b in a manner known in the art. The inner mounting portion 32 of the link member 16 includes a hole 66 extending vertically therethrough acting as a bushing that receives the pin 64. This hinged connection 60 permits the link member 16 to pivot relative to the side member 14 in response to a force acting thereon, thereby allowing a reaction force in the link member 16 to be transferred to the side member 14.

With reference to FIG. 3, in one form, the assembly 10 includes a spacer member 70 mounted to the inner wall portion 14a of the longitudinal side member 14. The spacer member 70 has a generally solid construction with an inboard end 72 being larger than the outboard end 74. The outboard end 74 is mounted to the longitudinal side member 14, with the inboard end 72 being disposed generally adjacent the engine E. As described above, the bulkhead 60c is disposed inside the longitudinal side member 14. The spacer member 70 is mounted adjacent the location of the bulkhead 60c. The inner mounting portion 32 of the link member 16 is generally aligned with the bulkhead 60c and the spacer 70, so that a force acting on the link member 16 will be transferred onto the spacer 70. Thus, a force transmitted in the y-direction at that location would cause the bulkhead 60c to transfer that force toward the spacer member 70, which would transfer that force toward the engine E, which will be described further below.

When assembled, the bumper 12, longitudinal side member 14, and link member 16 provide a skeleton around the engine compartment, along with various other support members that support the vehicle suspension, engine components, or the like, as is known in the art. The front wheels W of the vehicle are disposed outboard of the intermediate portion 42, rearward from the link member 16 and bumper extension 20, and forward from vehicle cabin structure C (see FIGS. 7 and 8).

Having described the support structure assembly 10, the operation of the assembly 10 during a collision will now be described, with reference to FIGS. 3-13. The bumper 12, link member 16, and longitudinal side member 14 are coupled to each other as described above. The function of the system 10 will be described with reference to a barrier 100 approaching the system 10 along the x-axis X toward the vehicle to create a small overlap collision; however, it will be appreciated that a vehicle including this system may be in motion itself and may strike a stationary structure, stationary vehicle, moving vehicle, or the like, and that the force might not be applied in a directly longitudinal manner.

With reference to FIG. 3, the barrier 100 is shown collided with the bumper 12 in a small overlap fashion, with the barrier 100 colliding in the area of the bumper extension 20. As shown, a curved corner 102 of the barrier is generally aligned with the longitudinal side member 14. At impact, the longitudinal side member 14 may be crushed in a region adjacent the bumper extension 20, resulting in a crushed portion 114. Additionally, the impact between the barrier 100 and the bumper extension 20 causes the bumper extension 20 to become partially flattened at the contact point of the collision. The rearward force on the bumper extension 20 causes the link member 16 to pivot outward at an angle A1 about the inner hinged connection 60. The outer hinged connection 36 permits the link member 16 and bumper extension 20 to bend relative to each other.

With reference now to FIG. 4, the barrier 100 has continued its encroachment on the system 10. The crushed portion 114 has become crushed even further, and the barrier 100 will force the bumper extension 20 against the link member 16, causing further outward rotation of the link member 16 about the hinged connection 60. The link member 16 will also pivot about the outer hinged connection 36 relative the bumper extension 20, which has become deformed relative to its nominal condition, creating a flattened portion 120. The link member 16 pivots about the inner hinged connection 60, with the link member 16 having rotated rearward at an angle of rotation A2 from its nominal position in response to the collision. The forward surface 24 of the link member is generally flat against a front surface 104 of the barrier 100, with the bumper extension flattened portion 120 sandwiched therebetween. As the barrier 100 continues to exert a force against the bumper extension 20 and the link member 16, the engagement between the barrier 100 and the forward surface 24 of the link member 16 is maintained, causing the force from the barrier 100 to be translated through the link member 16 toward the hinged connection 60 and the longitudinal side member 14.

Figure 5:
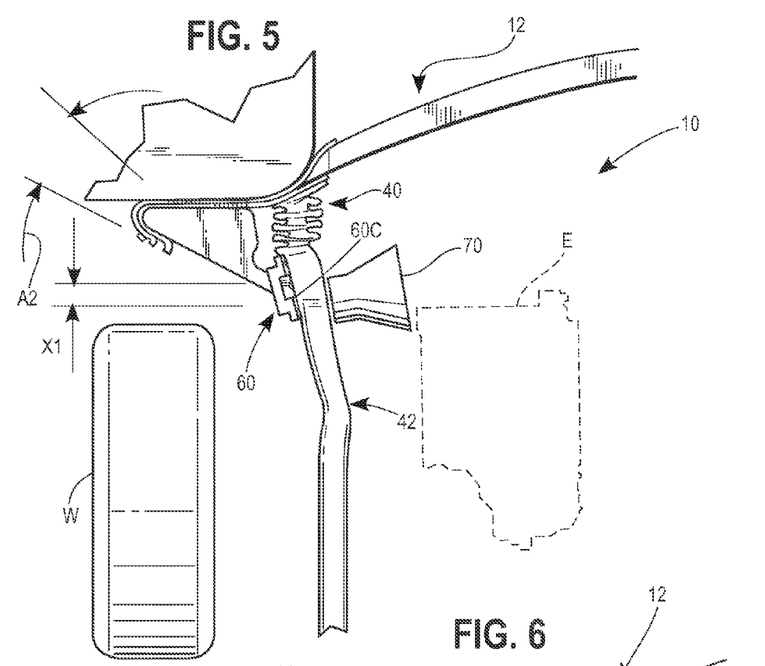

With reference now to FIG. 5, the barrier surface 104 maintains engagement with the link member front surface 24, and the inward force transferred by the link member 16 toward the longitudinal side member 14 causes the side member 14 to buckle inward at the side member intermediate portion 42. The bulkhead 60c, located adjacent the hinged connection 60, is forced inward as the longitudinal side member 14 is buckling. The bulkhead 60c transmits the inward force onto the spacer member 70. The spacer member 70 may then contact the engine components E of the vehicle, forcing the vehicle in the y-direction laterally away from the small overlap collision. The buckling of the intermediate portion 42 also results in the link member 16 translating rearward a distance X1 while maintaining generally flat contact with the barrier 100 and maintaining the pivoted angle A2 due to the maintained contact.

Figure 6:
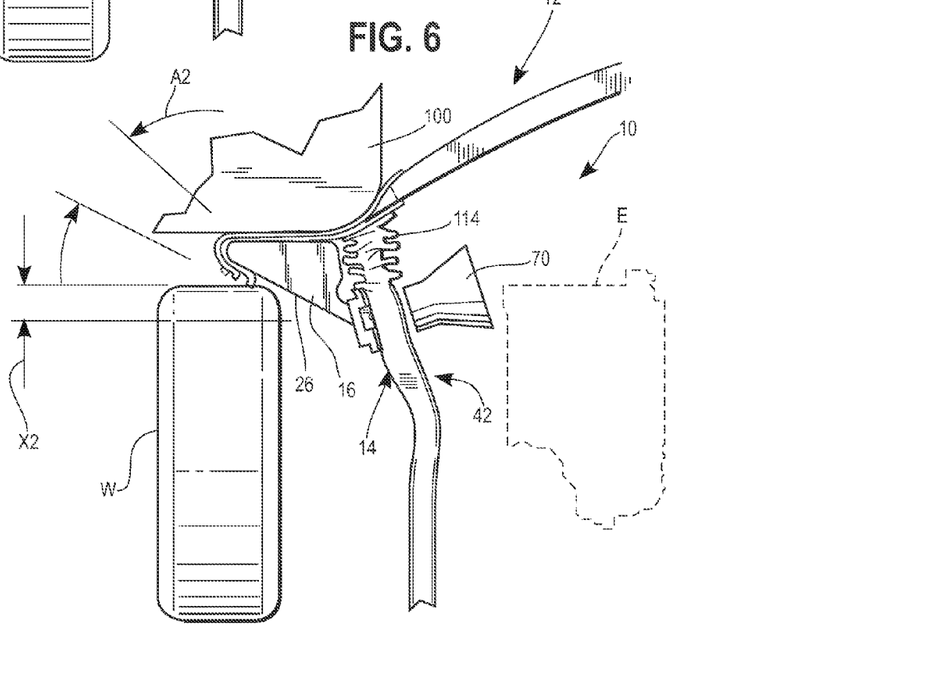

Turning now to FIG. 6, the crushed portion 114 of the front portion 40 is crushed further, the intermediate portion 42 is further buckled inward, and the barrier 100 has advanced rearward enough so that the rear surface 26 of the link member 16 will make contact with the vehicle wheel W. This condition can cause the wheel W to change position relative to the barrier 100 prior to the barrier 100 contacting the wheel W. Additionally, the buckling of the intermediate portion 42 has caused the spacer 70 to be forced further inward. The link member 16 and barrier 100 are still in contact during this condition, generally maintaining the angle A2. The link member 16 has also translated further rearward so it is at a distance X2 from its nominal position.

Figure 7:
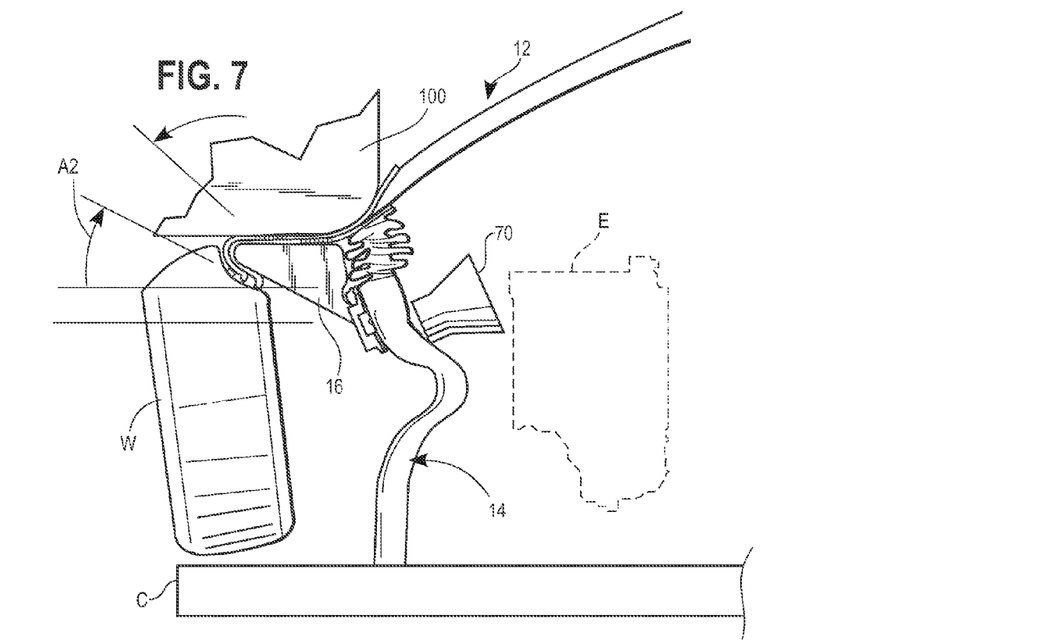

With reference to FIG. 7, the barrier 100 has moved further to the rear of the vehicle while maintaining contact with the link member 16, which has encroached into the wheel W. The side member 14 has become additionally buckled.

Figure 8:
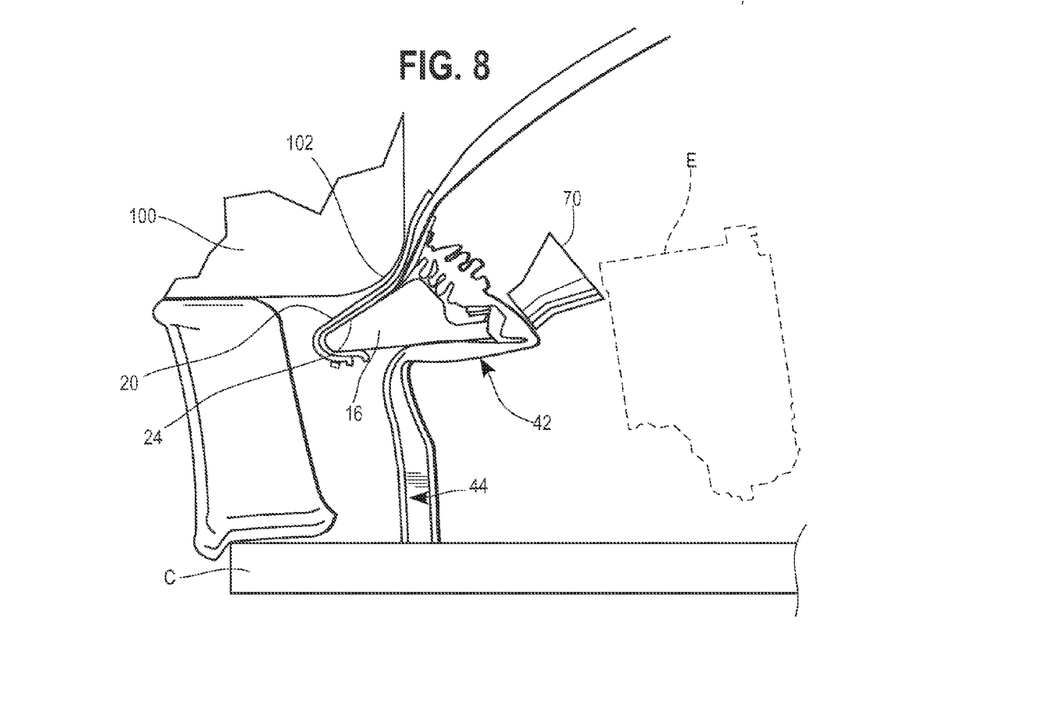

With reference to FIG. 8, the barrier 100 has now progressed far enough toward the rear that the flat contact between the link member 16 and the barrier 100 ceases. The barrier 100 has pushed the bumper extension 20 rearward enough that the bumper extension 20 pushes the link member 16 inward. Additionally, the link member 16 slides off of the barrier 100, and the inward force on the link member 16 causes the intermediate portion 42 to buckle further. The barrier 100 forces the wheel W rearward, which makes contact with the cabin structure C positioned rearward therefrom. The barrier 100 will continue to slide across the front surface 24 of the link member 16, thereby directing the barrier 100 outward and away from the vehicle.

The above described function of the system maintains the connection between the barrier 100 and the link member 16 while the longitudinal side member 14 is being crushed and buckled, thereby allowing the longitudinal side member 14 to receive a large amount of the impact force caused by the barrier 100, which in turn limits the amount of the impact force that the barrier 100 transfers to the vehicle cabin C. The above structure can thus reduce the amount of force received by the cabin structure C in a small overlap collision.

Given the unpredictable nature of vehicle collisions, the system 10 can also function to absorb a greater amount of force even if the barrier 100 slides off of the longitudinal side member 14 at the initial stages of a collision, which will be further described below.

Figures 9, 10:
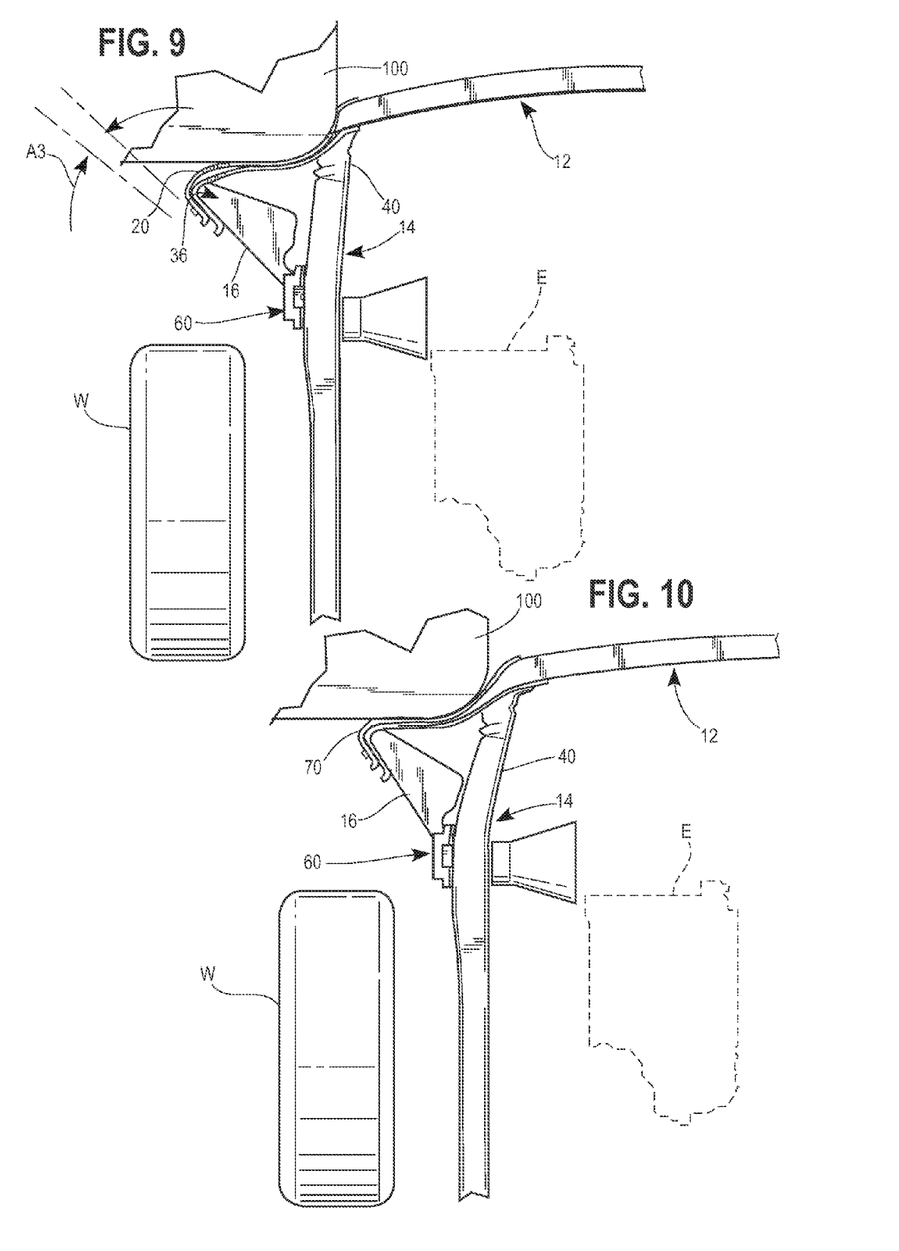
FIGS. 9-12 are top plan views of the support structure assembly of FIG. 1 showing an alternative state of the support structure assembly during a collision with a barrier.

With reference to FIG. 9, the barrier 100 initially collides with the vehicle in a smaller overlap condition. However, unlike the situation described above, the front portion 40 does not initially absorb a large amount of the force and become crushed. Rather, because the overlap condition is smaller, the front portion 40 slides off of the barrier 100 and moves inward. The bumper 12 and bumper extension 20 are pushed and pulled inward, respectively, which in turn pulls the outer mounting portion 30 of the link member 16 inward. The link member 16 maintains its connection to the bumper extension 20 due to the hinged connection 36, causing the link member 16 to pivot about its inner hinge connection 60 inward toward the front portion 40 of the side member 14. The link member 16 pivots at an angle A3 inward relative to its nominal position. The bumper extension 20 pulling on the link member 16 will cause it to continue to pivot inward until the barrier 100 has moved rearward enough to indirectly engage the link member 16, which is shown in FIG. 10.

With reference to FIG. 10, the barrier 100 has indirectly engaged the link member 16 and the front portion 40 of the side member 14 has shifted inward. The bumper extension 20 has become flattened and generally corresponds with the shape of the barrier 100.

Figure 11:
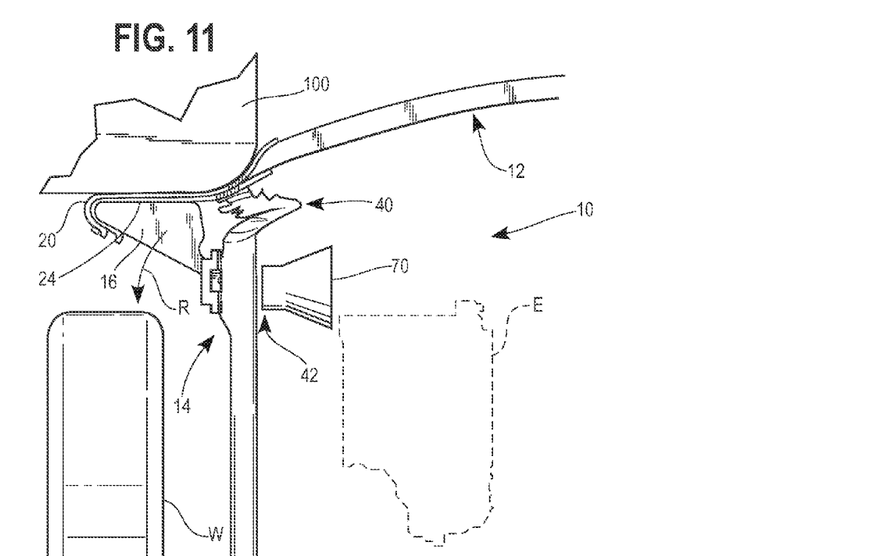

Turning now to FIG. 11, after the barrier 100 engages the link member 16, the barrier forces the link member 16 to pivot rearward (the direction of pivoting indicated by arrow R) toward the tire, to a condition similar to the condition shown in FIG. 4, except the front portion 40 of the side member 14 is buckled inward in FIG. 11 instead of being crushed or collapsed. The front surface 24 of the link member 16 will then engage the barrier 100 in a manner similar to the above. Similar to the above, the force from the barrier 100 will be transferred through the link member 16 toward the intermediate portion 42 of the longitudinal side member 14.

Figure 12:
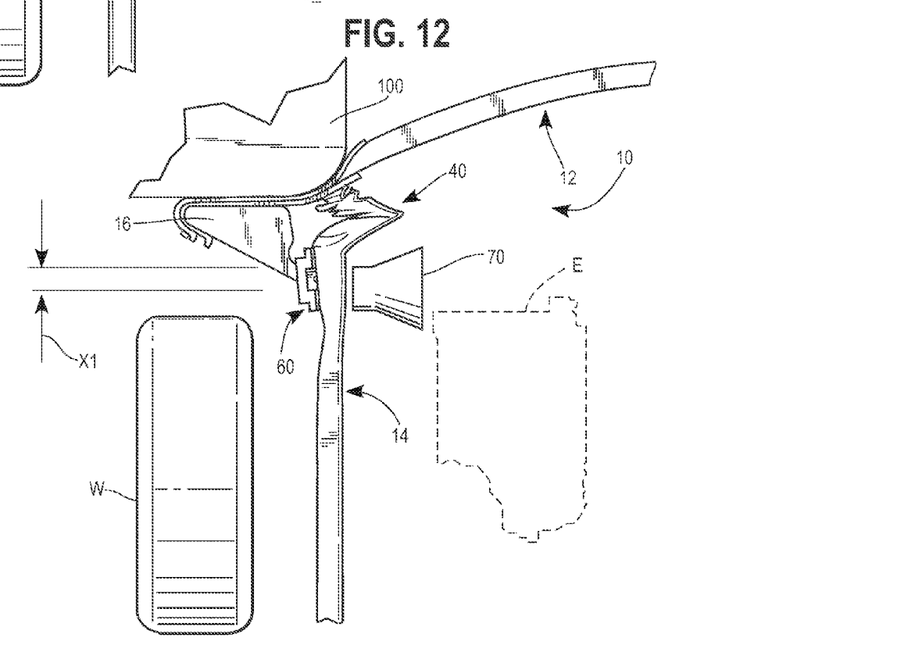

With reference to FIG. 12, the barrier 100 continues to maintain its engagement with the link member 16, forcing the link member 16 rearward a distance X1 from its nominal position. The force from the link member 16 is transferred to the longitudinal side member 14, causing it to start buckling inward near the inner hinged connection 60. Similar to the above, the spacer member 70 is forced inward as well.

At this point of the collision, the system acts in generally the same manner as described above with reference to FIGS. 6-8. The early and maintained engagement between the barrier 100 and the link member 16, with the force being transferred to the longitudinal side member 14, causes more of the collision to be absorbed by the longitudinal side member 14 due to the crushing and/or buckling, thereby limiting the amount of force that may ultimately be transferred to the cabin C.

Thus, even if the barrier slides off the front side member 14 initially, the link member 16 makes early contact with the barrier 100. The link member 16 then transfers the force of the impact to the longitudinal side member 14, which will subsequently buckle.

Figure 13:
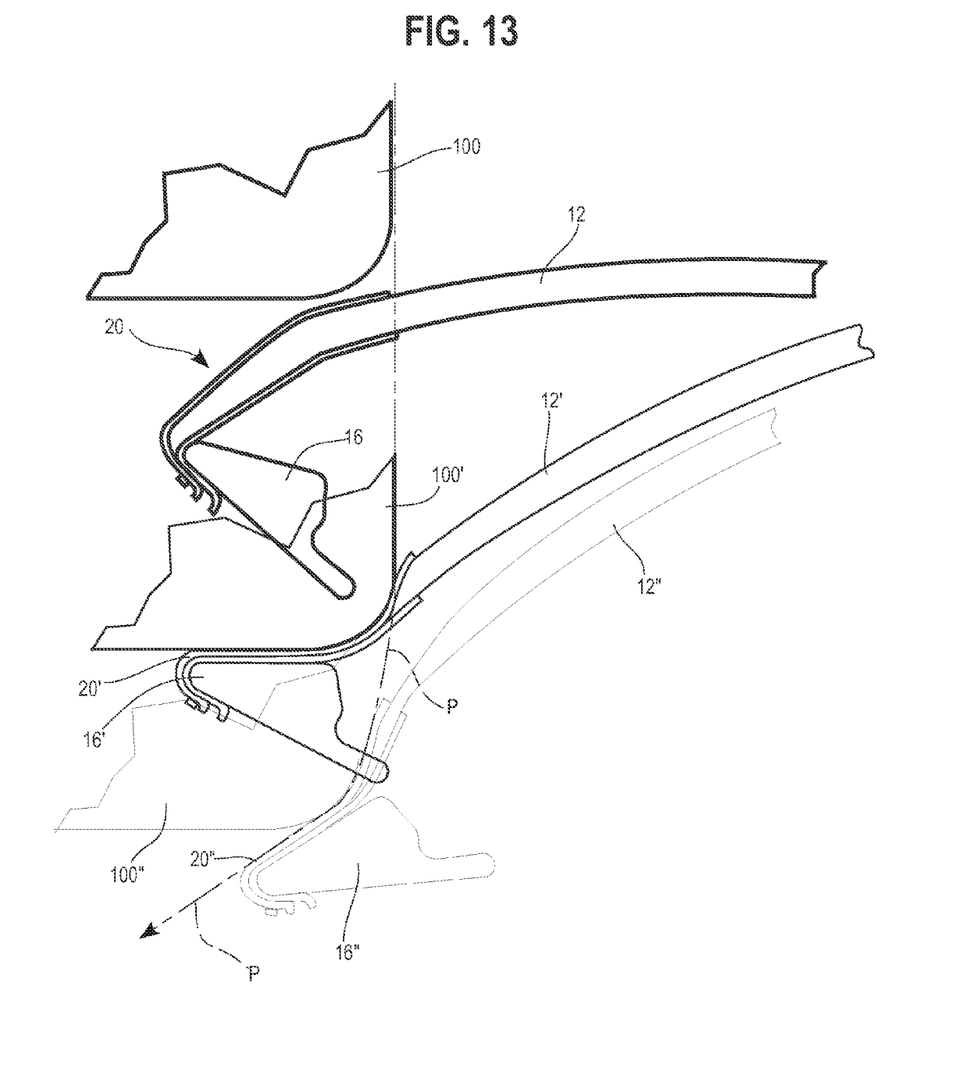
FIG. 13 is a top plan view of the support structure assembly of FIG. 1 showing the progression of the support structure assembly during a collision.

FIG. 13 illustrates the path that the barrier 100 takes relative to the vehicle and the system 10 with the link member 16 coupled to the bumper 12 and longitudinal side member 14. With the link member 16 installed, the barrier 100 is gradually moved away from the vehicle along path P, while maintaining engagement with the link member 16. The maintained engagement with the link member 16 causes the force from the collision to be transferred and absorbed by the longitudinal side member 14. Moreover, the inward buckling of the intermediate portion 42 of the longitudinal side member 14 moves the spacer 70 inward, impacting the vehicle engine E and forcing the vehicle laterally away from the barrier 100. Likewise, the barrier 100 moves laterally away from the vehicle. Thus, the barrier 100 can be directed away from colliding with the cabin C, while the system 10 absorbs a large amount of the impact in the crushing and buckling of the longitudinal side member 14.

FIG. 13 also illustrates the movement of the various components throughout the collision. As shown in FIG. 13, the link member 16 moves rearward relative to the nominal position upon being contacted by the barrier 100, as well as pivoting in the counter-clockwise direction. Further encroachment of the barrier 100 causes the link member 16 to pivot and translate further. Similarly, the bumper 12, including the bumper extension 20, is forced rearward, with the bumper extension 20 becoming flattened, while maintaining its connection with the link member 16. In FIG. 13, the progression of the link member 16 is shown progressing from the link member 16 being in the nominal position, to the position of link member 16' in an intermediate position, to the position of link member 16" indicating a subsequent position. The progression of the other components is indicated similarly.

The above description is meant as an illustration of implementation of the principles of the embodiments. This description is not intended to limit the scope or application of the embodiments in that the embodiments are susceptible to modification, variation and change, without departing from the spirit of the described embodiments, as defined in the following claims.

We claim:

1. A support structure assembly for an automotive vehicle, the support structure assembly comprising:
    a side member extending in a generally longitudinal direction and having a forward end, an inner wall portion, and an outer wall portion;
    a link member having a fixed shape, an outer mounting portion, and an inner mounting portion, wherein the inner mounting portion is mounted to the outer wall portion of the side member; and
    a bumper having a main bumper member and a bumper extension member forming an end portion of the bumper, wherein:
        the bumper is mounted to the forward end of the side member and to the outer mounting portion of the link member;
        the bumper extends generally transverse and lateral to the longitudinal direction of the side member; and
        the bumper extension member extends laterally across the forward end of the side member such that at least a portion of the bumper extension member extends laterally inward relative to the inner wall portion of the side member and at least a portion of the bumper extension member extends laterally outward relative to the outer wall portion of the side member.

2. The support structure assembly of claim 1, wherein:
    the bumper extension member comprises a forward wall portion and a rearward wall portion; and
    the rearward wall portion is sandwiched between the main bumper member and the forward end of the side member.

3. The support structure assembly of claim 1, wherein the bumper extension member is bolted to the main bumper member laterally inward from the side member.

4. The support structure assembly of claim 3, wherein the bumper extension member includes a forward wall portion and rearward wall portion and the rearward wall portion is bolted to the main bumper member laterally inward from the side member.

5. The support structure assembly of claim 2, wherein the forward wall portion and the rearward wall portion each have an outboard end and the outboard end of the forward wall portion and the outboard end of the rearward wall portion are connected to the outer mounting portion of the link member.

6. The support structure assembly of claim 5, wherein the outboard end of the forward wall portion and the outboard end of the rearward wall portion form a flange portion extending rearward and inward from the bumper extension member, the flange portion wrapping around the outer mounting portion of the link member.

7. The support structure assembly of claim 1, wherein the link member has a front surface facing forward and inward toward the bumper, the front surface engaging a barrier during a small overlap frontal impact with the corresponding bumper extension member such that an impact force between the barrier and the link member is translated to the side member through the link member.

8. The support structure assembly of claim 7, wherein:
the link member has a first major side surface, a second major side surface, and a third major side surface;
the first major side surface is the front surface;
the second major side surface faces the side member; and
the third major side surface faces away from the bumper and extends between the inner mounting portion and the outer mounting portion of the link member.

9. The support structure assembly of claim 8, wherein the first major side surface is substantially flat.

10. The support structure assembly of claim 1, wherein:
the side member comprises a front portion including indentations, a rear portion, and an intermediate portion disposed between the front portion and the rear portion;
the front portion of the side member is mounted to the bumper;
the inner mounting portion of the link member is mounted to the intermediate portion; and
a spacer member is mounted to the intermediate portion and positioned adjacent to a vehicle engine located inward from the side member.

11. The support structure assembly of claim 10, wherein a bulkhead is disposed inside the side member adjacent to the spacer member and positioned such that the inner mounting portion is aligned with the bulkhead and the spacer member.

12. The support structure assembly of claim 11, wherein:
the bulkhead is substantially U-shaped;
the side member comprises an opening in the outer wall portion; and
the bulkhead is positioned in the opening such that the U-shape of the bulkhead opens outward.

13. The support structure assembly of claim 12, wherein a patch member is mounted over the bulkhead such that a closed cavity is formed between the patch member and the bulkhead.

14. The support structure assembly of claim 1 wherein:
the side member includes an upper wall portion, a lower wall portion, an inner wall portion, and an outer wall portion;
the upper wall portion, the lower wall portion, the inner wall portion, and the outer wall portion at least partially define a cavity extending along the side member; and
the inner wall portion and the outer wall portion of the side member each include indentations allowing the side member to compress in response to a frontal impact force acting rearward thereon.

15. The support structure assembly of claim 1, wherein:
the side member includes an upper wall portion, a lower wall portion, an inner wall portion, and an outer wall portion;
the upper wall portion, the lower wall portion, the inner wall portion, and the outer wall portion at least partially define a cavity extending along the side member; and
the side member includes a tapered portion allowing the side member to buckle inward in response to a force acting inward on the side member.

16. The support structure assembly of claim 1, wherein the link member is pivotable from a first position to a second position and the outer mounting portion is disposed further forward in the first position than in the second position.

17. The support structure assembly of claim 16, wherein the inner mounting portion of the link member is disposed further inward and rearward in the second position than in the first position.

18. The support structure assembly of claim 16, further comprising a third position, wherein the outer mounting portion of the link member is further forward and inward in the third position than in the first position, and the link member is pivotable from the first position to the third position to the second position.

\* \* \* \* \*